United States Patent Office 3,700,550
Patented Oct. 24, 1972

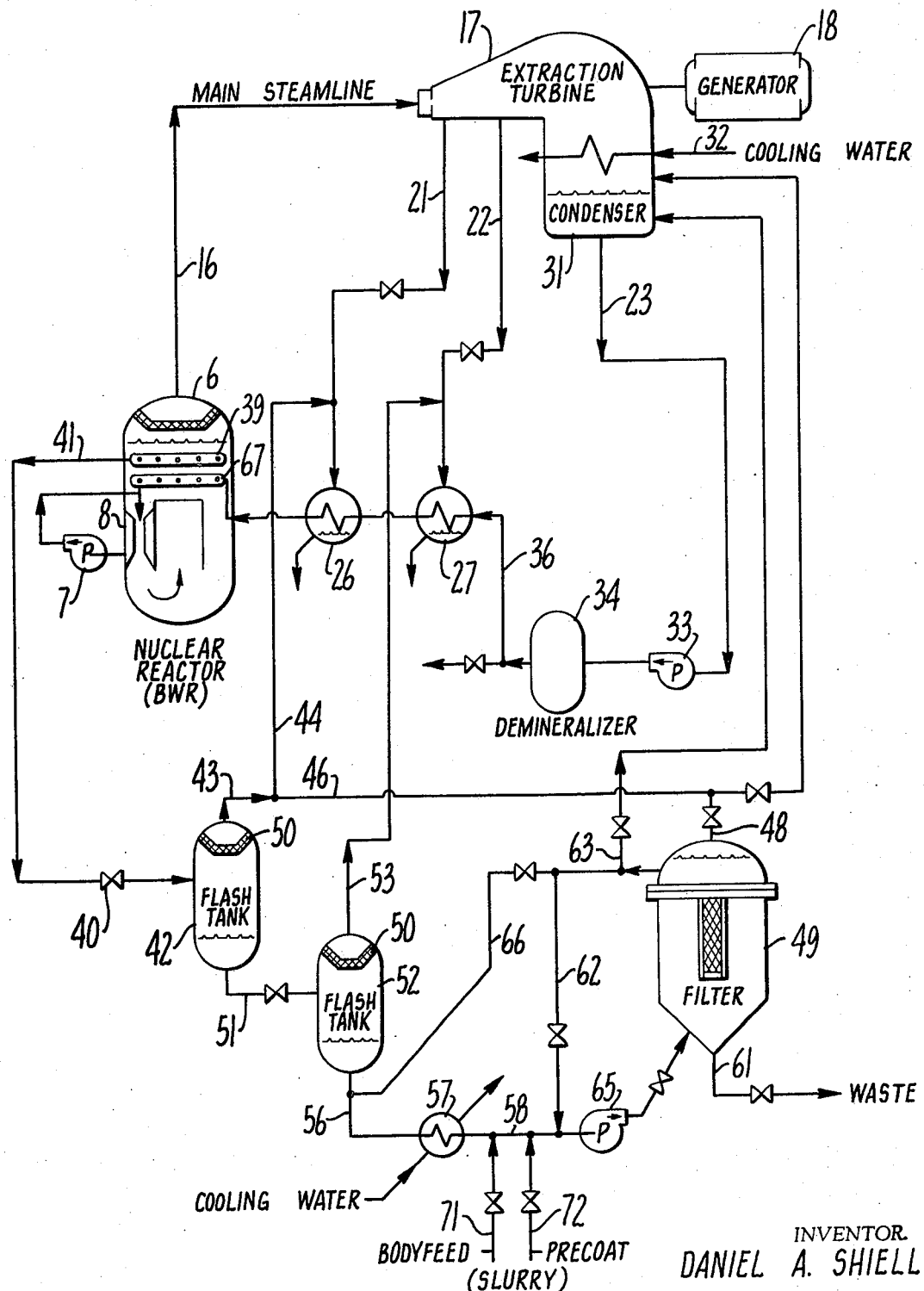

3,700,550
PROCESS FOR PURIFYING WATER UTILIZED IN A BOILING WATER REACTOR
Daniel A. Shiells, 1155 Jones St., #308, San Francisco, Calif. 94109
Filed Nov. 21, 1969, Ser. No. 878,619
Int. Cl. G21c 19/30
U.S. Cl. 176—37                                      5 Claims

ABSTRACT OF THE DISCLOSURE

The purity of reactor coolant is controlled by removing a stream of water from the reactor system at the pressure existing in the reactor. The removed stream is then passed to at least one low pressure area wherein the pressure is reduced to release flash steam which is employed to heat feedwater fed to the system. The water remaining after flashing is filtered to remove solids and is demineralized and is then returned as pure feedwater to the system.

SUMMARY OF THE INVENTION

In the boiling water type of nuclear reactor, the steam generated by the reactor and supplied to a power unit, such as a turbine generator, is relatively free of impurities. As a consequence, there is a continuous build-up of the concentration of impurities in the coolant remaining in the reactor even though the feedwater supplied to replenish the steam generated is of high purity when it enters the reactor coolant circuit. The recovery and disposal of such impurities is complicated and expensive because they are radioactive and they, together with the material used to remove them, must be handled as a radioactive waste.

The process of this invention takes advantage of the principle that soluble ionic impurities, such as iron, nickel and copper, which enter the reactor coolant circuit with the feedwater become insoluble impurities as a result of passing through the reactor core zone. Both nuclear irradiation of these impurities and their reaction with gases produced by the radiolytic decomposition of the reactor coolant promotes the production of insoluble impurities from soluble ions. I have found that it is possible to control the purity of the in-core coolant through the use of a particular filter and a demineralizer to remove soluble ions is not required except for the treatment of the feedwater supplied to the reactor system. Any dissolved ions remaining in the blowdown after filtration to remove turbidity can be removed by demineralization in the full flow condensate demineralizers together with the balance of the feedwater. Thus, this blowdown, re-enters the reactor circuit with the same quality as the feedwater. It is preferred to recover heat by means of a two-stage flash tank system in which both high pressure and low pressure steam is recovered and supplied to the plant feedwater heating cycle.

The recovery of heat in the turbine heat cycle, rather than in the reactor cycle, in this manner permits a substantial reduction to be made in the quantity of blowdown coolant remaining to be filtered. The concentration of impurities in the remaining blowdown is also increased. This results in a smaller filter being required and in a substantial reduction in the quantities of radioactive wastes which must presently be handled with the current clean-up systems.

Some of the advantages in this new reactor clean-up process over existing clean-up processes include the following:

(1) Eliminates high pressure stainless steel heat exchangers and substitutes low pressure carbon steel flash tanks;
(2) Eliminates the need for high pressure stainless steel piping systems and substitutes low pressure carbon steel piping instead;
(3) Eliminates high pressure celan-up process return pumps;
(4) Eliminates a clean-up demineralizer;
(5) Reduces the size of the filter required;
(6) Reduces the quantity of both liquid and solid radioactive waste which must be handled;
(7) Improves the purity of water in the reactor coolant system for the same rate of clean-up or blowdown flow; and
(8) Capital and operating costs are lower.

BRIEF DESCRIPTION OF THE DRAWING

The single figure in the drawing is a schematic showing of apparatus in the flowsheet.

DESCRIPTION OF THE PREFERRED EMBODIMENT

The purpose of the process is to maintain and control the concentration of impurities in the reactor coolant system at a sufficiently high level of purity to prevent the build-up of undesirable deposits on the internal surfaces of the reactor. This is accomplished by "blowing down" or removing a stream of reactor coolant from the reactor system, removing the impurities from the blowdown coolant, and finally returning the cleaned coolant to the system. At equilibrium the concentration of impurities in the reactor coolant can be controlled by varying the quantity of coolant blowdown.

Preferably the blowdown and clean-up is accomplished by means of a plural stage system of flash tanks followed by a turbidity removal filter. The purpose of this arrangement of equipment is to (1) recover heat from the blowdown coolant and return it to the power generation cycle, (2) concentrate the impurities in the remaining coolant, (3) reduce the quantity of coolant blowdown which requires removal of contained turbidity, (4) reduce the size of filtering equipment required and (5) reduce quantity of waste water and sludge which must be handled by the radioactive waste system.

Reactor coolant is removed from the reactor system preferably from just below the boiling water steam interface and prior to any mixing of this boiling water with incoming reactor feedwater. This location provides coolant with the highest level of "impurities" in the reactor since the water contains the impurities circulated through the reactor core plus those left behind by the steam which is being generated, and removed from the reactor at this location. The reactor coolant water so removed is supplied to one or more high pressure flash tanks where the pressure and temperature are reduced and steam is produced which is then supplied to the turbine-generator-feedwater heating system.

The steam produced in the flash tanks is passed through moisture separators and thus the remaining water will contain the impurities originally present in the coolant blowdown from the reactor system.

The water drained from the high pressure flash tank is supplied to one or more low pressure flash tanks where additional steam is produced and supplied to the turbine-generator-feedwater heating system. The remaining reactor coolant blowdown is suitably cooled to below its saturation temperature and supplied to a turbidity removal filter of the precoat type where its turbidity is removed by filtration. The effluent from the filter is delivered to the main turbine-generator condenser where it is mixed and subsequently de-mineralized and returned to the reactor as highly purified feedwater. By removing a stream of reactor coolant from the reactor coolant circuit and returning this water to the reactor as highly purified feedwater it is possible to achieve greater control of the purity of the in-core coolant as compared to that in the systems currently being used.

The backwash system employs steam rather than the usual compressed air to provide superior cleaning of the filter during the backwash and pre-coating cycles. Backwash water can be taken from the low pressure flash tank, thus eliminating a requirement for a backwash holdup tank.

The process of the invention enables a lower concentration of impurities to be maintained in the reactor coolant system for the same rate of clean-up flow since the water blown down to the high pressure flash tank has not been mixed with highly purified incoming feedwater as is the case with the current clean-up systems. In the current clean-up systems the concentration of impurities in the water removed from the reactor circuit is lowered by dilution with feedwater and in addition impurities remaining in the water after it has been de-mineralized in the clean-up system are returned directly to the reactor, thus these systems require a greater quantity of water to be removed to maintain the same concentrations of impurities in the reactor coolant circuit as the system of this invention provides.

Referring to the drawing for a specific embodiment of the invention, a nuclear reactor of the boiling water type is generally indicated at 6. Such reactors are well-known, being offered by various manufacturers such as General Electric. The reactor system includes an external auxiliary pump 7 for circulating water in the reactor through an internal circulating device generally indicated at 8. Steam is taken off from the reactor through line 16 to some means for utilizing the steam such as the extraction turbine, generally indicated at 17, and which drives the generator 18. The turbine preferably includes several stages and steam is taken off from each of these stages as through lines 21 and 22. Steam in line 21 is passed through a feed water heater 26 while that from line 22 is passed through feedwater heater 27. Steam from the final stage of the turbine is passed through a condenser 31, the latter being supplied with cooling water from line 32. Water from the condenser is passed by line 23 which returns the water to the reactor through line 36, heaters 27 and 26, the water being released in the reactor through header 67 which is located below the collecting ring 39.

Water in the reactor is taken off through collecting ring which is provided at an elevation in the reactor below the steam boiling water interface and above the feedwater inlet header 67. The water to be treated can also be taken from the outlet of pump 7 if desired. In either case, the water removed is passed through line 41 to a first flash tank 42 wherein the pressure is reduced and the flashed steam is taken off through line 43. Valve 40 in line 41 is employed to regulate the flow to flash tank 42. The flashed steam is taken through line 44 to mix with the steam in line 21 from the first stage of the turbine and is passed through feedwater heater 26 to heat incoming feedwater. Steam may also be taken through line 46 and passed either to the filter or into the condenser 31. Steam is thus available to backwash the filter and it is not necessary to introduce air or gases into the system. Water remaining in the flash tank 42 is passed through line 51 to a second flash tank 52 wherein the pressure is further reduced. Steam from flash tank 52 is passed through line 53 to mix with steam in line 22 from the second stage of the turbine which steam is used to heat incoming feedwater in feedwater heater 27. Each flash tank includes a steam-water separator 50. Water from the flash tank 52 is passed through line 56 to the heat exchanger 57 where it is cooled slightly and then fed through line 58 to pump 65 and thence to the filter 49. In the filter, any solid particles causing turbidity are removed. The filtered water is taken through line 63 to condenser 31 to issue with the water from the condenser to be passed through the de-mineralizer 34 and thence through 31 to heat exchanger 27 and ultimately this water is returned to reactor 6. Line 62 is a recirculating line which is provided to enable water to be recycled through the filter. Waste is discharged through line 61 when the filter is backwashed and cleaned. Body feed and precoat for the filter is supplied in controlled amounts as a slurry through lines 71 and 72. Line 66 may be employed should it be necessary to bypass the filter as during start-up of the reactor or cleaning of the clean-up system. Suitable and appropriate valves are shown diagrammatically in the drawing but have not been described since their functioning and utility will be obvious to one skilled in the art.

I claim:

1. A process for controlling the purity of reactor coolant water in a nuclear power plant using a boiling water reactor having a core within a pressure vessel, a steam outlet, a feedwater inlet, and a high pressure reactor coolant circuit, said feedwater inlet being above an internal coolant circulation device which circulates the coolant downwardly between the core and vessel wall and then back up through the core, and said inlet being below the interface between boiling water and steam in the reactor comprising:
   (a) removing a stream of reactor coolant water containing impurities from the high pressure coolant circuit in the reactor from a point in the reactor coolant circuit just below the boiling water steam interface in the reactor and above the feedwater inlet and prior to the mixing of the reactor coolant being internally circulated by incoming reactor feedwater;
   (b) reducing the pressure on the removed stream in a first flash tank to flash steam therefrom and increase the concentration of impurities remaining in the stream of water;
   (c) separating the steam from the remaining water containing said concentration of impurities and utilizing said steam to heat incoming feedwater;
   (d) further reducing the pressure on said remaining water in a second flash tank to flash steam therefrom and further increase the concentration of impurities remaining in the stream of water;
   (e) cooling the remaining water after the stem has been flashed therefrom in the second flash tank;
   (f) purifying the cooled water to remove impurities; and
   (g) discharging the purified stream to the feed water system for the reactor for further processing before return to the reactor coolant circuit.

2. A process for controlling the purity of reactor coolant water as in claim 1, wherein the steam flashed from the water in the second flash tank is utilized to heat incoming feedwater.

3. A process as in claim 1 wherein steam flashed from the stream of water removed from the reactor coolant circuit is employed to backwash and remove the contained impurities and filter materials from a filter used in the purification of the stream of water.

4. A process as in claim 1 wherein filtering is performed on the removed stream of water.

5. A process as in claim 1 wherein demineralization is performed on the removed stream of water.

References Cited

UNITED STATES PATENTS

| | | | |
|---|---|---|---|
| 3,147,191 | 9/1964 | Crowther | 176—55 X |
| 3,359,174 | 12/1967 | Helbling | 176—55 X |
| 3,400,049 | 9/1968 | Wolfe | 176—55 X |
| 3,400,048 | 9/1968 | Boardman et al. | 176—55 X |
| 3,029,197 | 4/1962 | Untermyer | 176—55 X |
| 2,806,820 | 9/1957 | Wigner | 176—54 |
| 2,787,593 | 4/1957 | Metcalf | 176—54 X |
| 3,034,975 | 5/1962 | Beurtheret | 176—55 X |

FOREIGN PATENTS

| | | | |
|---|---|---|---|
| 851,820 | 10/1960 | Great Britain | 176—55 |
| 637,005 | 2/1962 | Canada | 176—54 |

CARL D. QUARFORTH, Primary Examiner

H. E. BEHREND, Assistant Examiner

U.S. Cl. X.R.

176—55